United States Patent
Brand

(10) Patent No.: US 9,743,125 B2
(45) Date of Patent: Aug. 22, 2017

(54) SYSTEM AND METHOD FOR VISUAL EDITING

(71) Applicant: TRIMVID, LLC, Belleair Bluffs, FL (US)

(72) Inventor: Hunt K. Brand, Belleair Bluffs, FL (US)

(73) Assignee: TRIMVID, LLC., Belleair Bluffs, FL (US)

( * ) Notice: Subject to any disclaimer, the term of this patent is extended or adjusted under 35 U.S.C. 154(b) by 0 days.

(21) Appl. No.: 13/932,327

(22) Filed: Jul. 1, 2013

(65) Prior Publication Data

US 2015/0007032 A1    Jan. 1, 2015

Related U.S. Application Data

(60) Provisional application No. 61/690,762, filed on Jul. 3, 2012.

(51) Int. Cl.
| | |
|---|---|
| *G11B 27/02* | (2006.01) |
| *H04N 21/414* | (2011.01) |
| *G11B 27/034* | (2006.01) |
| *G11B 27/34* | (2006.01) |
| *H04N 21/472* | (2011.01) |

(52) U.S. Cl.
CPC ..... *H04N 21/41407* (2013.01); *G11B 27/034* (2013.01); *G11B 27/34* (2013.01); *H04N 21/47205* (2013.01)

(58) Field of Classification Search
CPC .................................................. G11B 27/02
USPC ........................................................ 715/723
See application file for complete search history.

(56) References Cited

U.S. PATENT DOCUMENTS

| | | |
|---|---|---|
| 2,918,524 A | 12/1959 | Hume |
| 3,028,454 A | 4/1962 | Kohorn |
| 3,538,265 A | 11/1970 | Keeler, II |
| 4,282,606 A | 8/1981 | Factor |
| 4,408,309 A | 10/1983 | Kiesling et al. |
| 4,633,331 A | 12/1986 | McGrady et al. |
| 4,897,741 A | 1/1990 | Inoue et al. |

(Continued)

OTHER PUBLICATIONS

VlogginLife, "Magix Movie Edit Pro Tutorial—Super Timelapse and Slow Motion", Youtube video, Feb. 3, 2013 Retrieved on [Nov. 25, 2014], Retrieved from the internet <URL:https://www.youtube.com/watch?v=-11t1wpttXE> entire document.

*Primary Examiner* — Andrey Belousov
*Assistant Examiner* — Seth A Silverman
(74) *Attorney, Agent, or Firm* — Brainspark Associates, LLC

(57) ABSTRACT

The invention is directed to a system and method for visual editing of an input signal. Accordingly, it includes an editing device comprising a device screen, a media module, a user input module, and an output module. The media module receives an input signal which includes at least one visual component. The device screen comprises a source screen and a delay screen, wherein the input signal is displayed on the source screen in real time, and the input signal is displayed on the delay screen in delay time, with the delay time being adjustable. The user input module allows the user to create at least one clip comprising a portion of the input signal as it is displayed on the delay screen. The output module is structured to output the clip.

20 Claims, 7 Drawing Sheets

(56) References Cited

U.S. PATENT DOCUMENTS

| | | |
|---|---|---|
| 4,943,865 A | 7/1990 | Hales et al. |
| 4,982,390 A | 1/1991 | Tanaka |
| 5,029,013 A | 7/1991 | Hiratsuka et al. |
| 5,126,982 A | 6/1992 | Yifrach |
| 5,241,428 A | 8/1993 | Goldwasser et al. |
| 5,329,320 A | 7/1994 | Yifrach |
| 5,463,599 A | 10/1995 | Yifrach et al. |
| 5,546,245 A | 8/1996 | Sato |
| 5,668,639 A | 9/1997 | Martin |
| 5,682,326 A * | 10/1997 | Klingler et al. .............. 715/202 |
| 5,701,383 A | 12/1997 | Russo et al. |
| 5,974,220 A * | 10/1999 | Kajimoto ..................... 386/278 |
| 6,035,367 A | 3/2000 | Laws |
| 6,324,336 B1 * | 11/2001 | Kanda ........................... 386/282 |
| 6,324,338 B1 | 11/2001 | Wood et al. |
| 6,614,986 B2 | 9/2003 | Tognazzini |
| 6,637,029 B1 | 10/2003 | Maissel et al. |
| 6,647,479 B1 | 11/2003 | Laws |
| 7,103,840 B2 | 9/2006 | Ihara et al. |
| 7,365,704 B2 | 4/2008 | Wang et al. |
| 7,529,465 B2 | 5/2009 | Barton et al. |
| 7,558,472 B2 | 7/2009 | Locket et al. |
| 7,643,728 B2 | 1/2010 | Noda et al. |
| 7,668,435 B2 | 2/2010 | Lockett et al. |
| 7,773,860 B2 | 8/2010 | Wood et al. |
| 7,869,699 B2 | 1/2011 | Mate et al. |
| 7,903,953 B2 | 3/2011 | Yoon et al. |
| 7,925,141 B2 | 4/2011 | Geer et al. |
| 7,945,935 B2 | 5/2011 | Stonedahl |
| 7,990,338 B2 | 8/2011 | Teng et al. |
| 8,102,457 B1 | 1/2012 | Anderson |
| 8,127,232 B2 | 2/2012 | Pavley et al. |
| 8,380,049 B2 | 2/2013 | Lang et al. |
| 8,745,500 B1 | 6/2014 | Kostello et al. |
| 2001/0051032 A1 * | 12/2001 | Tognazzini ............ G11B 20/10 386/229 |
| 2003/0038830 A1 * | 2/2003 | Bean .................... G11B 27/105 715/719 |
| 2010/0088634 A1 * | 4/2010 | Tsuruta ................. G06F 3/0488 715/800 |
| 2011/0239142 A1 * | 9/2011 | Steeves ..................... G06F 3/14 715/764 |
| 2011/0310247 A1 * | 12/2011 | Rensin .............. H04L 29/06027 348/143 |
| 2012/0210217 A1 * | 8/2012 | Abbas .................. G11B 27/031 715/716 |
| 2012/0308209 A1 * | 12/2012 | Zaletel ................. G11B 27/034 386/278 |
| 2014/0143671 A1 | 5/2014 | Kovalick |

* cited by examiner

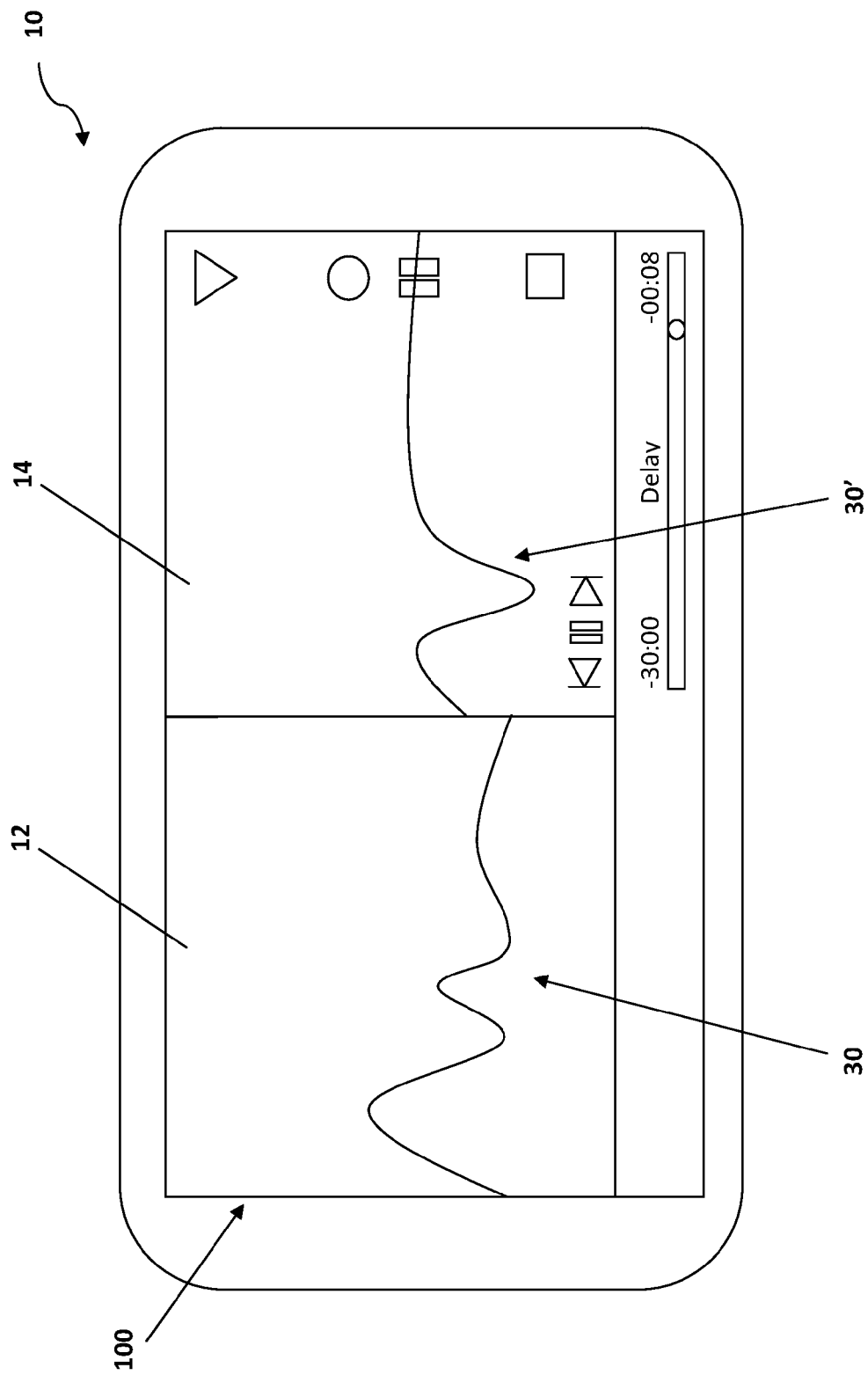

SYSTEM AND METHOD FOR VISUAL EDITING

BACKGROUND OF THE INVENTION

Field of the Invention

The present invention relates to a system and method for visual editing of an input signal using a source screen displaying the input signal in real time and a delay screen displaying the input signal in delay time.

Description of the Related Art

Video editing is the process of editing segments of video footage, special effects, and sound recordings. Video editing typically occurs in a post production process, after the filming is complete. In this process, relevant clips of the raw footage or data are cut and then pieced together in a viewable and coherent format, and may further include other signal processing and other enhancements.

As such, traditional video editing requires the user to first capture the raw video footage and/or sound recordings. The user must then transport or transmit the raw data from the capture or source device to a video editor or program for post production. Further, in order to determine which segments of the raw data to use in a resulting clip, the user is required to watch, rewind, or fast forward to track the starting points and end points of each portion to be extracted.

As such, there is a need for an improved system and method which enables a user to selectively create clips from a raw data source, while overcoming disadvantages and problems of the type set forth above.

SUMMARY OF THE INVENTION

The present invention is directed to a system and method for visual editing of an input signal, wherein the input signal may comprise a video signal and/or a visual representation of a non-video signal, such as, by way of example only, a visual representation of an audio signal, an EKG, a speed profile, a direction profile, a temperature profile, etc., such as lends itself to a visual representation in real time that may be displayed on a device screen. Specifically, in at least one embodiment, the present invention enables visual editing of a signal through use of a source screen that visually displays the input signal in real time, and a delay screen that visually displays the input signal in delay time. This allows a user to selectively extract or edit portions of an input signal while watching the input signal as displayed on the delay screen, in order to create a clip from the input signal.

As such, at least one embodiment of the present invention comprises an editing device including a media module, a device screen, a user input module, and an output module.

The media module is structured to receive an input signal from a signal source, and in one embodiment, the signal source may comprise a video camera, a digital video camera, a computer, a server, a mobile electronic device, a camera, an electrocardiograph device, another editing device, or another device capable of transmitting an input signal to the media module.

In one embodiment of the present invention, the device screen comprises a source screen and a delay screen. The source screen is structured to display the input signal in real time. The delay screen is structured to display the input signal in delay time. The source screen and delay screen may be displayed on the device screen in different configurations, in at least one embodiment.

The user input module, in accordance with one embodiment of the present invention, is structured to allow a user to select an input signal for display on both a source screen and a corresponding delay screen. The user input module may also allow the user to change the configurations of the source screen and the delay screen as displayed on the device screen. The user input module, in at least one embodiment, further allows the user to initiate recording of a clip of the input signal as displayed on the delay screen, as well as to pause or terminate recording of the clip. The user may also set or adjust the delay time of the delay screen through the user input module, in accordance with one embodiment of the present invention. For instance, if the user misses the portion that he or she wishes to record, the user may increase the delay interval so that the portion is displayed again in the delay screen.

In accordance with at least one embodiment of the present invention, the output module is structured to transmit a clip to an output device, and in one further embodiment, the output device comprises an internal memory of the editing device itself. In at least one embodiment, the clip comprises a digital media file, and may be transmitted as a stream or feed to one or more output devices, which may comprise an external device or an internal memory of the editing device itself.

These and other objects, features and advantages of the present invention will become clearer when the drawings as well as the detailed description are taken into consideration.

BRIEF DESCRIPTION OF THE DRAWINGS

For a fuller understanding of the nature of the present invention, reference should be had to the following detailed description taken in connection with the accompanying drawings in which:

FIG. 4 is a plan view of one other illustrative embodiment of an editing device in accordance with the present invention having a device screen displaying a visual representation of an audio signal on a source screen and a delay screen.

DETAILED DESCRIPTION

As stated above, the present invention is directed to a system for visual editing of an input signal, generally as shown as 200 throughout the figures, as well as a method for visual editing of an input signal, generally shown as 300 throughout the figures.

Figure 1:
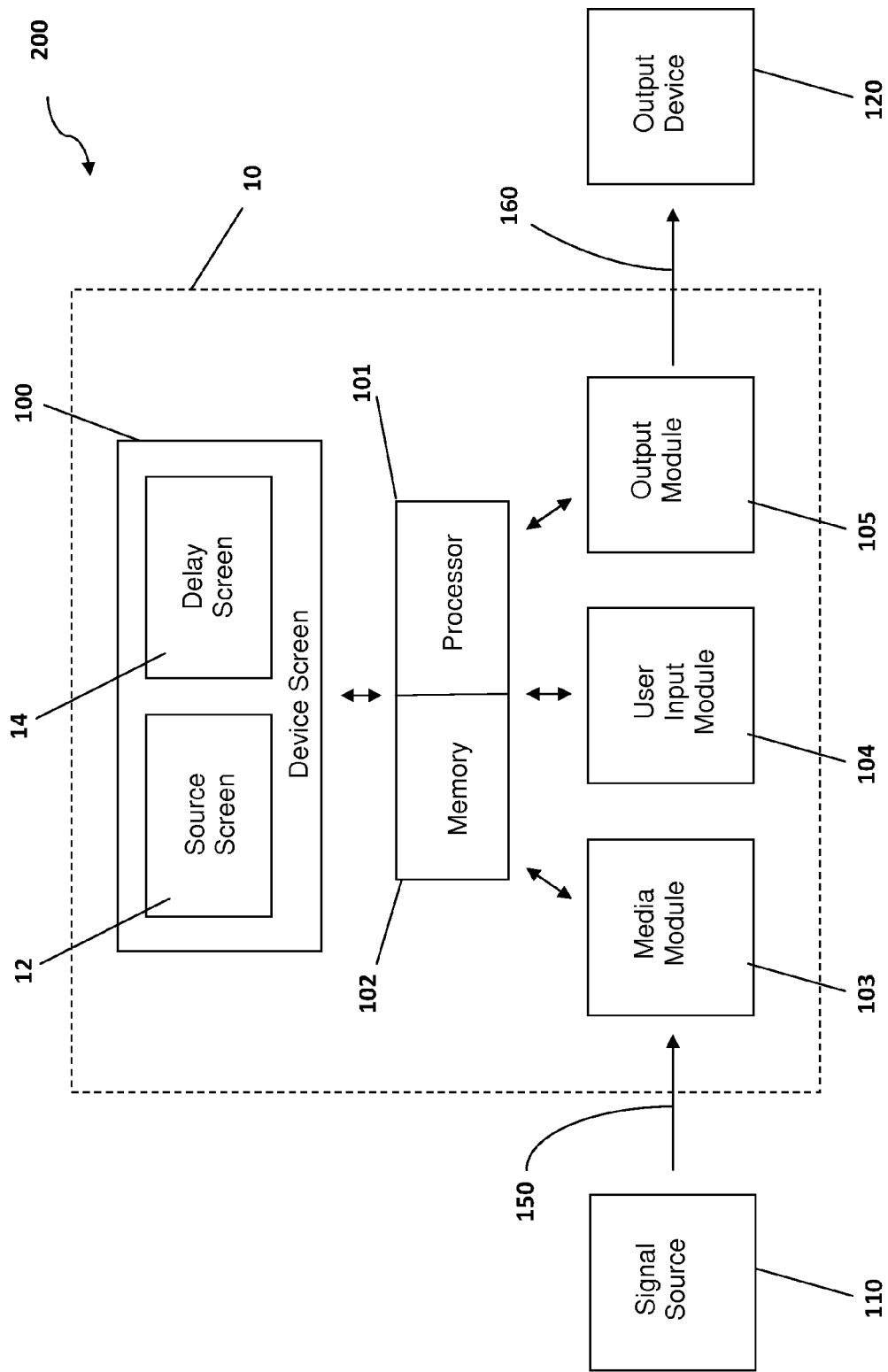
FIG. 1 is a diagrammatic representation of one illustrative embodiment of a system for visual editing of an input signal.

FIG. 1 is a diagrammatic representation of one embodiment of a system 200 for visual editing of an input signal 150 in accordance with the present invention. The system 200 as shown in FIG. 1 comprises a signal source 110 structured at least in part to transmit an input signal 150 to an editing device 10, wherein the input signal 150 comprises at least one visual component, and in at least one embodiment, the input signal 150 comprises a video signal and/or a visual representation of an audio signal. The editing device 10 is structured at least in part to display and at least temporarily store an input signal 150 transmitted thereto. As such, in at least one embodiment, the editing device 10 includes a processor 101 and/or a memory 102. In one further embodiment, an editing device 10 comprises a device screen 100 disposed in a communicative relationship with a media module 103, a user input module 104, and/or an output module 105. The processor 101 and memory 102 are structured to allow the modules 103, 104, and/or 105 to operatively communicate with one another, as well as with the device screen 100. The output module 105, in at least one embodiment, is structured at least in part to at least temporarily store a clip 160 comprising one or more portions of an input signal 150.

In accordance with at least one embodiment of the present invention, the editing device 10 comprises, but is in no manner limited to, a video camera, a digital video camera, a computer, a cell phone, a smart phone, a tablet, or another mobile electronic device capable of displaying an input signal 150. In one further embodiment, the editing device 10 comprises a wearable device, such as, once again by way of example only, glasses or visors, watches, or other electronic accessories capable of displaying an input signal 150.

A signal source 110 in accordance with the present invention comprises a device capable of transmitting an input signal 150 having at least one visual component. For instance, in one embodiment, the signal source 110 comprises a computer, a server, or a mobile electronic device which transmits an input signal 150 to an editing device 10, and more in particular, to a media module 103 of the editing device 10. In another embodiment, the signal source 110 comprises a video camera or a web camera which transmits an input signal 150 comprising live video to the editing device 10, and in one further embodiment, the signal source 110 comprises a video camera built into the editing device 10 itself. In another embodiment, the signal source 110 is a memory module, storage medium, or the like of an editing device 10, wherein the editing device 10 receives an input signal 150 from a signal source 110 comprising storage medium and circuit pathways of the editing device 10 itself. In at least one further embodiment, the signal source 110 comprises another editing device 10.

As previously stated, in at least one embodiment, a media module 103 is structured to receive an input signal 150 from a signal source 110. In one embodiment, a media module 103 is capable of receiving an input signal 150 from any of a plurality of signal sources 110. In one further embodiment, a media module 103 concurrently receives a different one of a plurality of input signals 150 from each of a corresponding plurality of different signal sources 110. The media module 103 is structured to play different digital files, streams, and live feeds, and as such, in at least one embodiment, the media module 103 comprises hardware and software, such as video and audio codecs, required to decode and display different input signals 150 to a device screen 100.

In accordance with one embodiment of the present invention, the device screen 100 comprises at least one source screen 12 and at least one delay screen 14. The device screen 100 is capable of displaying both a source screen 12 and a delay screen 14 concurrently, with each of the source screen 12 and the delay screen 14 comprising at least a portion of the device screen 100, such as is shown in the illustrative embodiment of FIG. 2. At least one other embodiment of the present invention comprises a plurality of device screens 100, wherein one device screen 100 is integral with an editing device 10 itself, and another device screen 100 is separate and/or remote from the editing device 10, such as, by way of example only, a first device screen 100 on a digital video camera, and a second device screen 100 comprising a remote monitor disposed in a communicative relationship with the editing device 10 via a wired or wireless connection.

The source screen 12, in at least one embodiment, is structured to display an input signal 150 in real time. As used herein, "real time" shall mean that an input signal 150 is transmitted from a signal source 110 to a media module 103 and is displayed on a source screen 12, without a perceivable time delay to a user.

In at least one further embodiment, a delay screen 14 is structured to display an input signal 150 in delay time. As used herein, "delay time" shall mean the period of time between the live or "real time" display of an input signal 150 from a signal source 110 on a source screen 12, and the display of the input signal 150, which in at least one embodiment is at least temporarily stored in a buffer of memory 102 of the editing device 10, on a delay screen 14. In at least one embodiment, the delay time is preset, for example, a delay time of eight seconds, however, the delay time can be reset or adjusted by a user. In one embodiment, a user adjusts a delay time via a user input module 104, and in one further embodiment, the delay time is reset or adjusted during the display of an input signal 150 on a source screen 12 and/or a delay screen 14.

Figure 6:
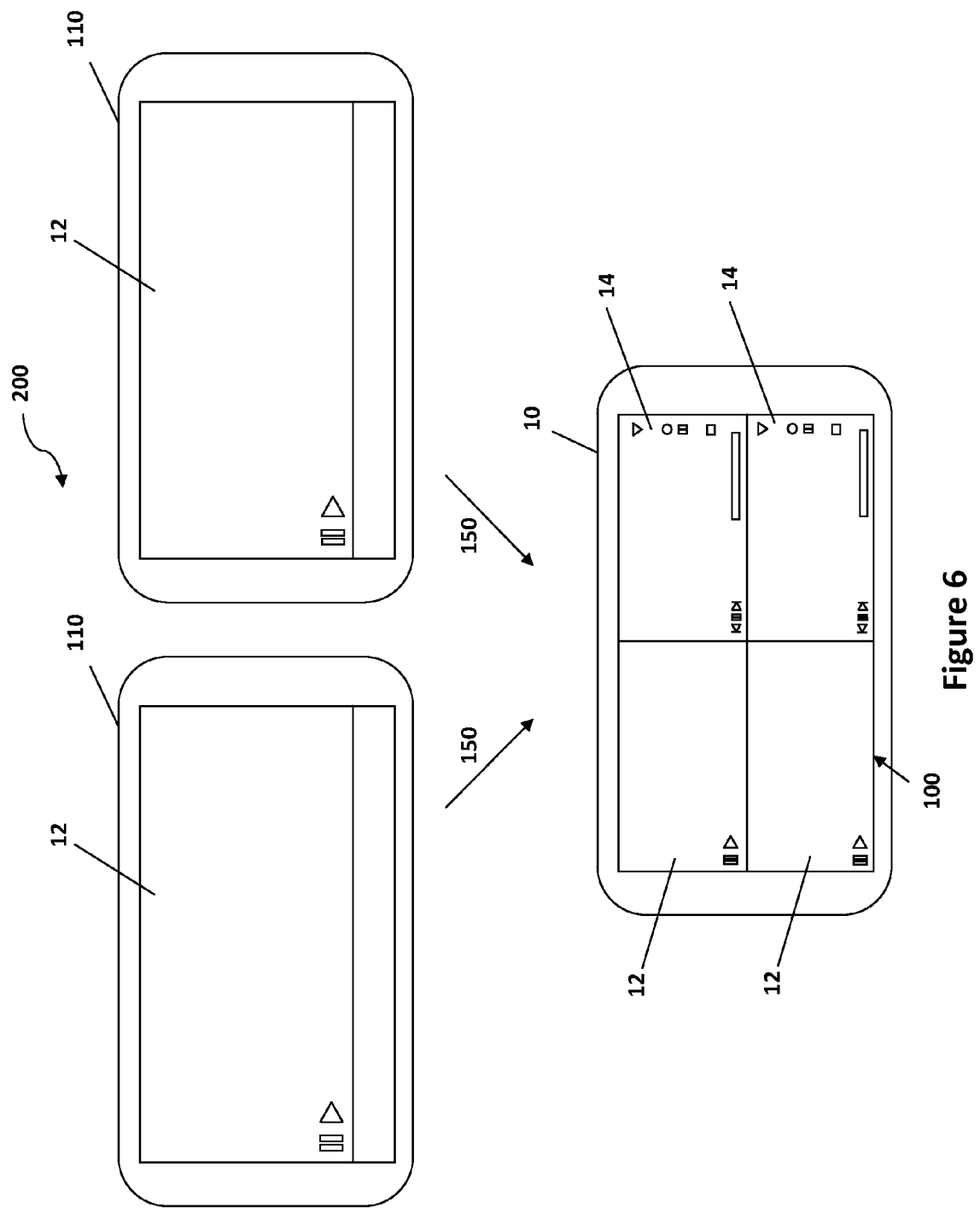
FIG. 6 is a schematic representation of one other illustrative of a system in accordance with the present invention comprising a plurality of signal sources linked to a single editing device.

The user input module 104, in at least one embodiment of the present invention, is structured to allow a user to select an input signal 150 for display on at least one source screen 12 in real time and on at least one delay screen 14 in delay time. In an embodiment having a plurality of input signals 150 and a device screen 100 having a plurality of source screens 12, such as shown in the illustrative embodiment of FIG. 6, a user input module 104 further allows a user to selectively display different ones of the plurality of input signals 150 on different ones of the plurality of source screens 12 and correspondingly different ones of a plurality of delay screens 14. Further, a user input module 104 allows a user to select different display configurations of a source screen 12 and a delay screen 14 on a device screen 100.

In at least one embodiment, a user input module 104 also allows a user to effect editing of an input signal 150 as it is displayed on a delay screen 14. A user input module 104 allows a user to create at least one clip 160 comprising at least a portion of an input signal 150 as it is displayed on a delay screen 14. In at least one embodiment, a user input module 104 allows a user to initiate recording of a clip 160 of an input signal 150 as it is displayed on a delay screen 14, based on the visual image the user previously viewed on a source screen 12.

More in particular, in at least one embodiment, a user views a display of an input signal 150 in real time on a source screen 12, and when he or she views a portion or scene which he or she wishes to keep, the user can initiate recording a clip 160 of the input signal 150 at the start of the same scene just as or just prior to the scene being displayed on the delay screen 14, because the user knows when the scene will begin as he or she just viewed it in real time on the source screen 12. In one further embodiment, a user may be viewing live action which is being captured and transmitted to an editing device 10 as an input signal, and, as before, the user can initiate recording a clip 160 of the input signal 150 at the start of an event the user just saw as it is being displayed on the delay screen 14, because the user knows when the event begins as he or she just watched it occur.

In at least one embodiment, the user input module 104 also allows the user to pause recording of the clip 160, and in one further embodiment, the user input module 104 allows the user to resume recording to the same clip 160. In one further embodiment, recording of the clip 160 continues while the image on the delay screen 14 is paused. In yet another embodiment, the input signal 150 is displayed on delay screen 14 in slow motion, in order to allow more accurate editing, or in fast motion, in order to catch up to the source screen 12 display once recording has been initiated, however, in this embodiment, the clip 160 will capture the portion of the input signal 150 for playback in normal speed. In yet one further embodiment, the input signal 150 is displayed on delay screen 14 in slow motion or fast motion, and the clip 160 will capture the portion of the input signal 150 for playback in either slow motion or fast motion, exactly as it was displayed on delay screen 14.

In one further embodiment, the user input module 104 also allows the user to terminate recording of the clip 160. In at least one embodiment, upon termination of recording the clip 160 is at least temporarily stored on the editing device 10, such as, for example, in memory 102, and in one further embodiment, the clip 160 is automatically transferred to an output device 120 via an output module 105.

The user input module 104 in accordance with at least one embodiment of the present invention further allows the user to set or adjust a delay time for display of an input signal 150 on a delay screen 14. More in particular, in one embodiment, the user sets or adjusts a delay time while an input signal 150 is displayed on a source screen 12, or a delay screen 14, or both. In another embodiment, a user sets or adjusts a delay time while an input signal 150 is being edited. In one further embodiment, a user input module 104 comprises one or more of physical buttons, touch capacitive sensing on a touchscreen input 100', motion tracking or sensing, voice activation, and/or remote input from another device.

The output module 105, in at least one embodiment, is structured to transmit a clip 160 to an output device 120. The clip 160 comprises at least a portion of an input signal 150 created by the editing device 10. The output device 120, in at least one embodiment, comprises a memory 102 of the editing device 10, such as an internal hard disk, an attached memory card, embedded nonvolatile flash memory, or other such storage. The output device 120, in one further embodiment, comprises remote storage such as a server or cloud storage provider accessible through a communication network such as the Internet. The output module 105, in one embodiment, transmits a clip 160 in raw format, and in at least one other embodiment, the output device 105 encodes the clip 160 with at least one codec, and/or prompts the user to select what file type or compression format in which to transmit the clip 160. As one example, the output module 105 is structured to process and encode the clip in one of Xvid, DivX, MPEG, H.264, WMV, WMA, MP3, MP4, etc.

In at least one embodiment, an output module 105 transmits a clip 160 in a stream or live feed format. In at least one embodiment, the output device 120 comprises a computer, server, television, video monitor, tablet, audio player, or mobile electronic device. In one other embodiment, the output device 120 comprises another editing device 10. This allows multiple users to edit an input signal 150 in a cascading fashion. For example, a first user edits an input signal 150 on a first editing device 10 during a sporting event and transmits a first clip 160 to one or more second editing device 10 via output module 105. The second editing device 10 receives the first clip 160 and the second user edit the first clip 160 thereby creating a second and further edited clip 160. In at least one embodiment, the output module 105 of the first editing device 10 first transmits the first clip 160 to a remote server, and other editing devices 10 download or stream an input signal 150 consisting of the first clip 160 from that remote server.

The output module 105 is triggered upon a termination event which, in at least one embodiment, comprises a user input via the user input module 104, e.g., actuation of a stop button. In at least one embodiment, the output module 105 automatically saves a clip 160 upon reaching the end of an input signal 150. In one further embodiment, the output module 105 automatically saves a clip 160 upon a time out request, or an operational error, such as, but not limited to, a camera malfunction, low battery, or software crash.

As previously stated, the editing device 10 may comprise, but is not limited to, a mobile electronic device, a phone, or a tablet. In this embodiment, the editing device 10 comprises a device screen 100. The device screen 100 illustrates a side by side configuration of the source screen 12 and the delay screen 14. The device screen 100 further comprises a touchscreen input 100' including recording controls 21, delay controls 25, and playback controls 29, such as is illustrated in the embodiment of FIG. 2.

Playback controls 29, in at least one embodiment, comprise a playback slide bar 29' used to select a portion of an input signal 150 to be displayed on a source screen 12. Playback controls 29 in one further embodiment comprise playback buttons 29" including a play button to initiate playback of an input signal 150, and a pause button to at least temporarily pause the playback of an input signal 150. In at least one embodiment, the playback controls 29 are present only when the input signal 150 comprises a digital media file or a media stream. In another embodiment having an input signal 150 comprising a live feed, playback controls 29 are not necessary and are therefore not displayed. However, in at least one other embodiment, the editing device 10 retains a buffer of a live feed, and as such, playback controls 29 are operational in such an embodiment.

Delay controls 25, in at least one embodiment, comprise a delay slide bar 25' used to adjust a delay time for the display of an input signal 150 on a delay screen 14. The delay time shown in FIG. 2 ranging from 8 seconds and 30 minutes is for illustrative purposes only and is not limiting, as greater or lesser delay time limits and/or ranges are within the scope and intent of the present invention. Delay controls 25 in one further embodiment of the present invention comprise delay adjustment buttons 25" which are operative to incrementally increase or decrease a delay time. In at least one embodiment, the delay adjustment buttons 25" allow the display of the input signal 150 on the delay screen 14 to be at least temporarily paused. In at least one embodiment, while the delay screen 14 is paused, the delay time automatically increases if the source screen 12 continues to display the input signal 150. In another embodiment, the delay controls 25 furthers comprise a delay increment button 25''' to increase delay time in a preset interval which, in at least one embodiment, is selected and/or adjusted by the user. In one further embodiment, delay controls 25 are locked out when the editing device 10 is recording, while in one further embodiment, the delay controls 25 remain operative when the editing device 10 is recording.

Figure 2:
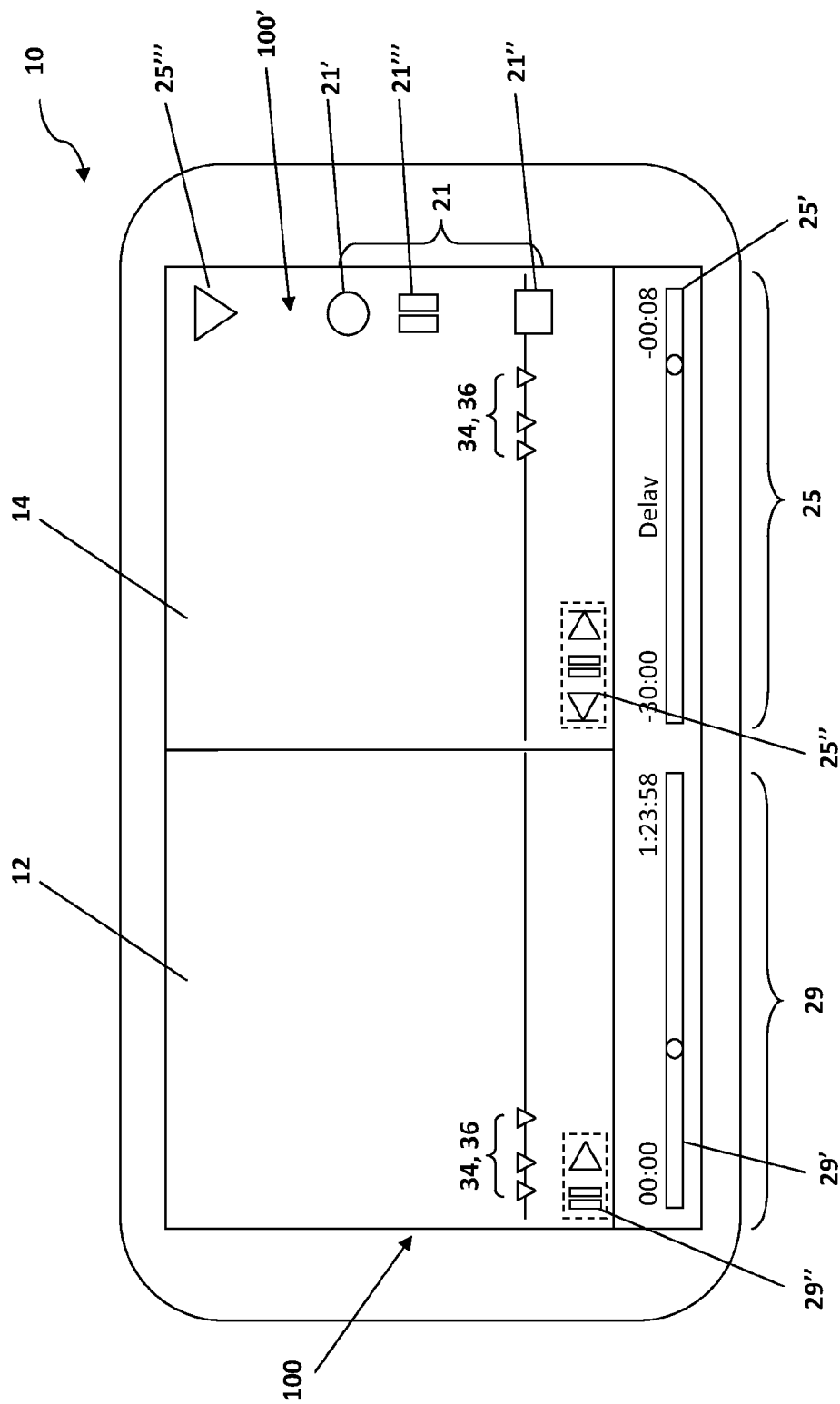
FIG. 2 is a plain view of one illustrative embodiment of a user interface of an editing device in accordance with the present invention having a device screen comprising a source screen and a delay screen disposed in a side by side configuration.

Recording controls 21, in at least one embodiment, comprise a record button, a pause button, and a stop button, as shown best in FIG. 2. As such, a user may begin recording a clip 160, pause recording of a clip, and stop recording a clip 160 as an input signal 150 is displayed on the delay screen 14. In at least one embodiment, a user can pause recording of a clip 160 and later resume recording to the same clip 160.

Figure 3A:
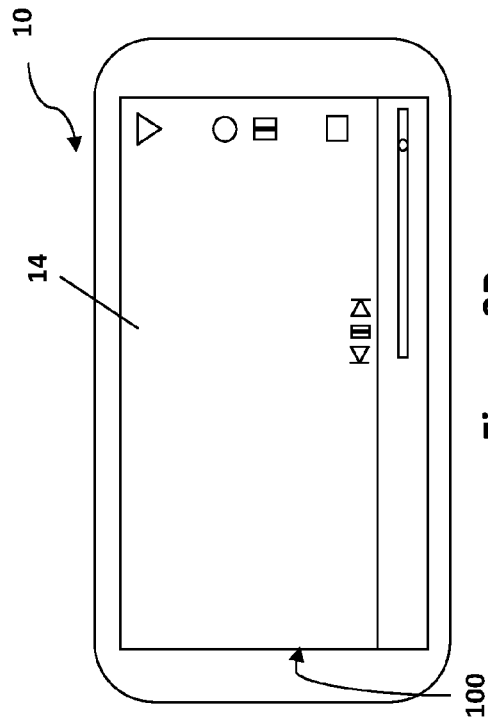
FIG. 3A is a plain view of the illustrative embodiment of FIG. 2 having a device screen comprising a source screen only configuration.
Figure 3B:
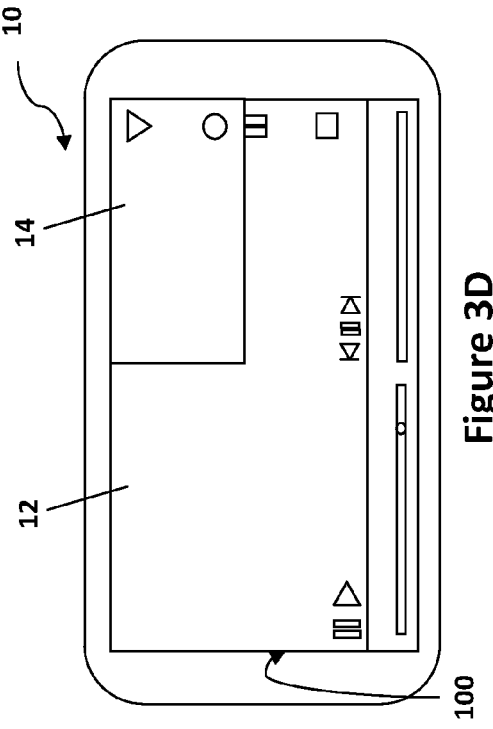
FIG. 3B is a plain view of the illustrative embodiment of FIG. 2 having a device screen comprising a delay screen only configuration.
Figure 3C:
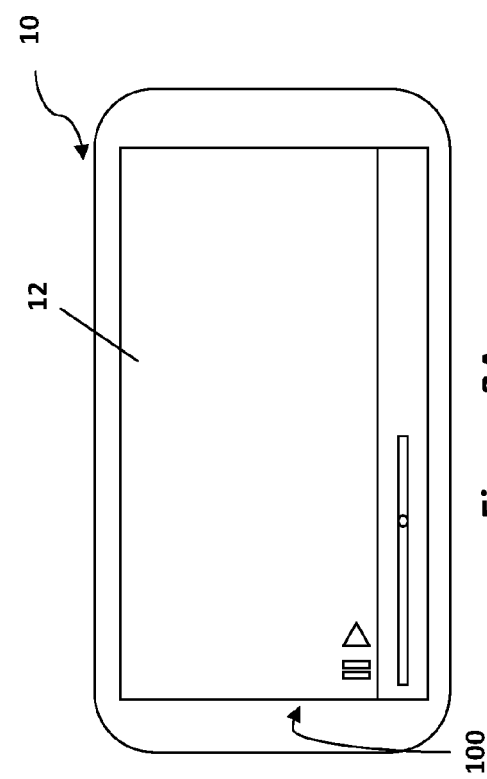
FIG. 3C is a plain view of the illustrative embodiment of FIG. 2 having a device screen comprising a source screen in a picture-in-picture configuration.
Figure 3D:
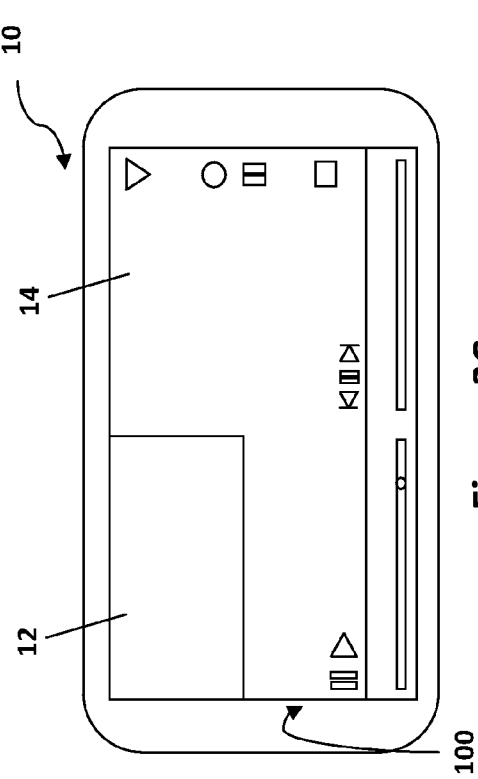
FIG. 3D is a plain view of the illustrative embodiment of FIG. 2 having a device screen comprising a delay screen in a picture-in-picture configuration.

Looking next to the illustrative embodiments of FIGS. 3A through 3D, it is seen that the device screen 100 of the editing device 10 can present at least one source screen 12 and at least one delay screen 14 in various display configurations. As one example, FIG. 3A illustrates a source screen 12 only configuration, wherein the source screen 12 comprises substantially the entire device screen 100. As another example, FIG. 3B illustrates a delay screen 14 only configuration, wherein the delay screen 14 comprises substantially the entire device screen 100. FIG. 3C illustrates an example of a source screen 12 picture-in-picture configuration, wherein the source screen 12 comprises only a portion of the device screen 100 while the delay screen 14 comprises the remainder of the device screen 100. Lastly, FIG. 3D illustrates a delay screen 14 picture-in-picture configuration, wherein the delay screen 14 comprises only a portion of the device screen 100 while the source screen 12 comprises the remainder of the device screen 100. A user may switch between various display configurations of the source screen 12 and the delay screen 14 via touchscreen input 100'. In at least one embodiment, the user may switch between the various display configurations using a swiping motion via touchscreen input 100', and in one further embodiment the display configuration is affected by "pinching" a portion of the touchscreen input 100'. In at least one other embodiment, a user may switch between various display configurations using input such as motion sensing or tracking, i.e., shaking the editing device 10, flipping the editing device 10, voice command, etc.

Looking next to the illustrative embodiment of FIG. 4, an input signal 150 comprises an audio signal, and a visual representation of an audio signal 30, 30' are displayed on source screen 12 and delay screen 14, respectively. As displayed on the source screen 12, the visual representation of an audio signal 30 is shown in real time, and as displayed on the delay screen 14, the visual representation of an audio signal 30' is shown in delay time. The visual representations of an audio signal 30, 30' may comprise waveforms, such as shown in FIG. 4. In one further embodiment, visual markers, such as a delay time line tag 34, 36 indicating where sound occurs in a video display to assist a user in editing an input signal 150 based on an audible component, such as, a sound occurring by something or someone off screen and not visually perceivable in the source screen 12 or delay screen 14. In at least one embodiment, a delay time line tag 34, 36, as shown in FIG. 2, is inserted by tapping the touchscreen input 100' on source screen 12 during display of an input signal 150 thereon in real time, and in one other embodiment, a button or similar control is operable to insert one or more delay time line tag 34, 36. In one further embodiment, a visual marker is keyed to particular frequencies and/or amplitudes of sound to assist the user in editing of the input signal 150. In at least one embodiment, the visual representations of an audio signal 30, 30' are displayed concurrently with another visual component, such as a video signal. The visual representations of a signal are not limited to audio signals, but may comprise other signals such but not limited to EKG, temperature, direction, speed, etc.

Figure 5:
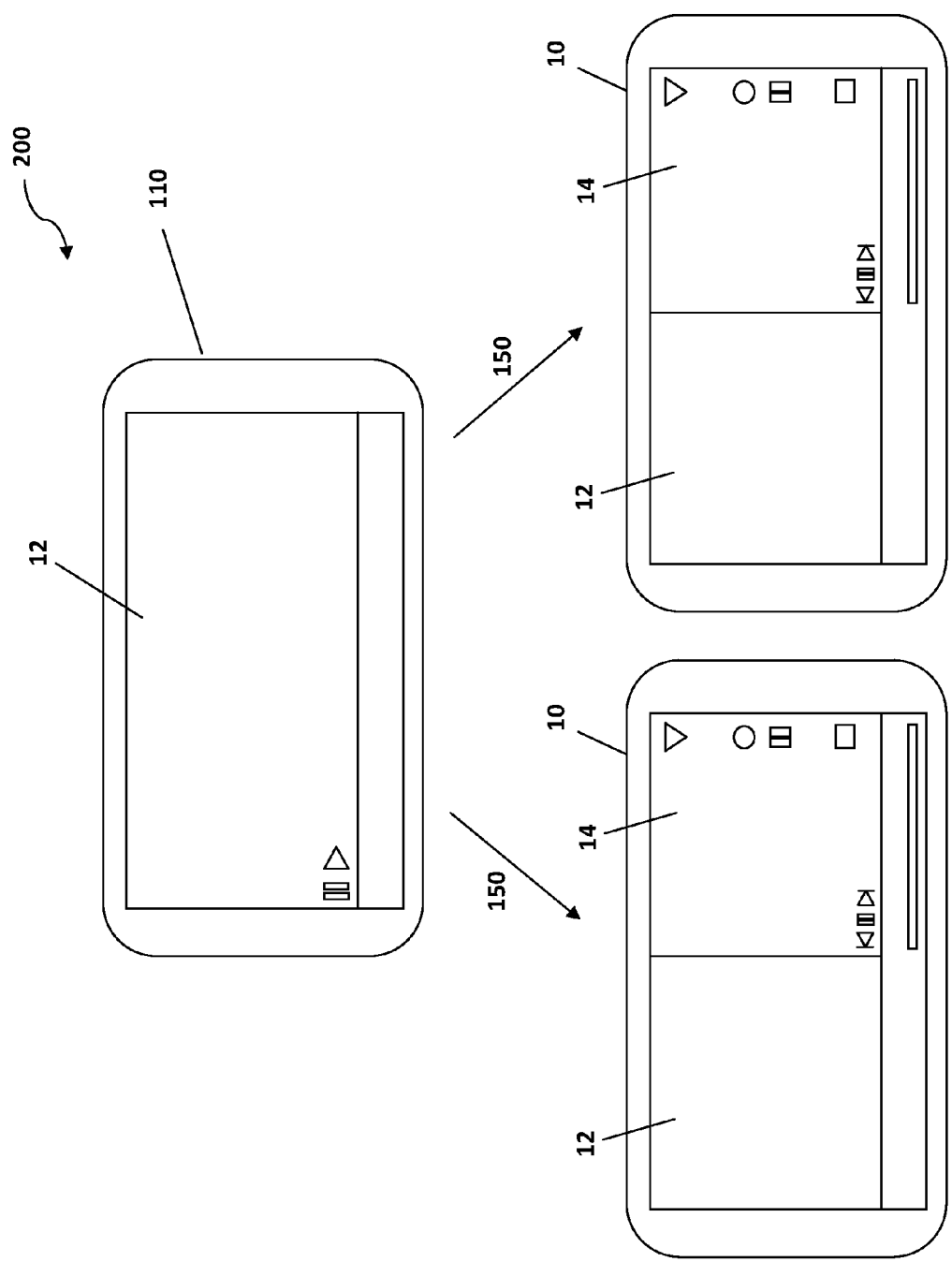
FIG. 5 is a schematic representation of one illustrative embodiment of a system in accordance with the present invention comprising a single signal source linked to a plurality of editing devices.

As illustrated in FIG. 5, at least one embodiment of the present invention comprises a plurality of editing devices 10. In the illustrative embodiment of FIG. 5, at least one editing device 10 acts as a signal source 110 and transmits an input signal 150 to each of a plurality of different editing devices 10. The user of the signal source 110 focuses on recording operations, while the user of each of the plurality of editing devices 10 focuses on editing an input signal 150 from the signal source 110.

As one example, a user of a signal source 110 records a high school football game, and the user of each of a plurality of different editing devices 10 receives an input signal 150 from the signal source 110. Further, each user edits the input signal 150 to create a different clip 160, wherein the clip 160 created by each user consists of video highlights of different players.

In one alternative embodiment, a plurality of signal sources 110 record from different vantage points, and each of the plurality of signal sources 110 transmits an input signal 150 to an editing device 10, to allow simultaneous editing of multiple input signals 150. As just one example, a plurality of signal sources 110 are setup at different angles and locations to record a football game, and each signal source 110 transmits a different input signal 150 to an editing device 10. A user of the editing device 10 can select one of the plurality of different input signals 150 and edit one of the plurality of different input signals 150 to create a clip 160 having a duration of 10 seconds, and the editing device 10 will simultaneously create a clip 160 of the same 10 seconds from each of the remaining plurality of different input signals 150. This allows a clip 160 of the exact same event, e.g., the exact same 10 second interval, to be viewed from different perspectives. In at least one embodiment, the signal sources 110 and editing devices 10 are linked together via wired or wireless communication, such as via LAN, WiFi, Bluetooth, or other communication technologies.

Figure 7:
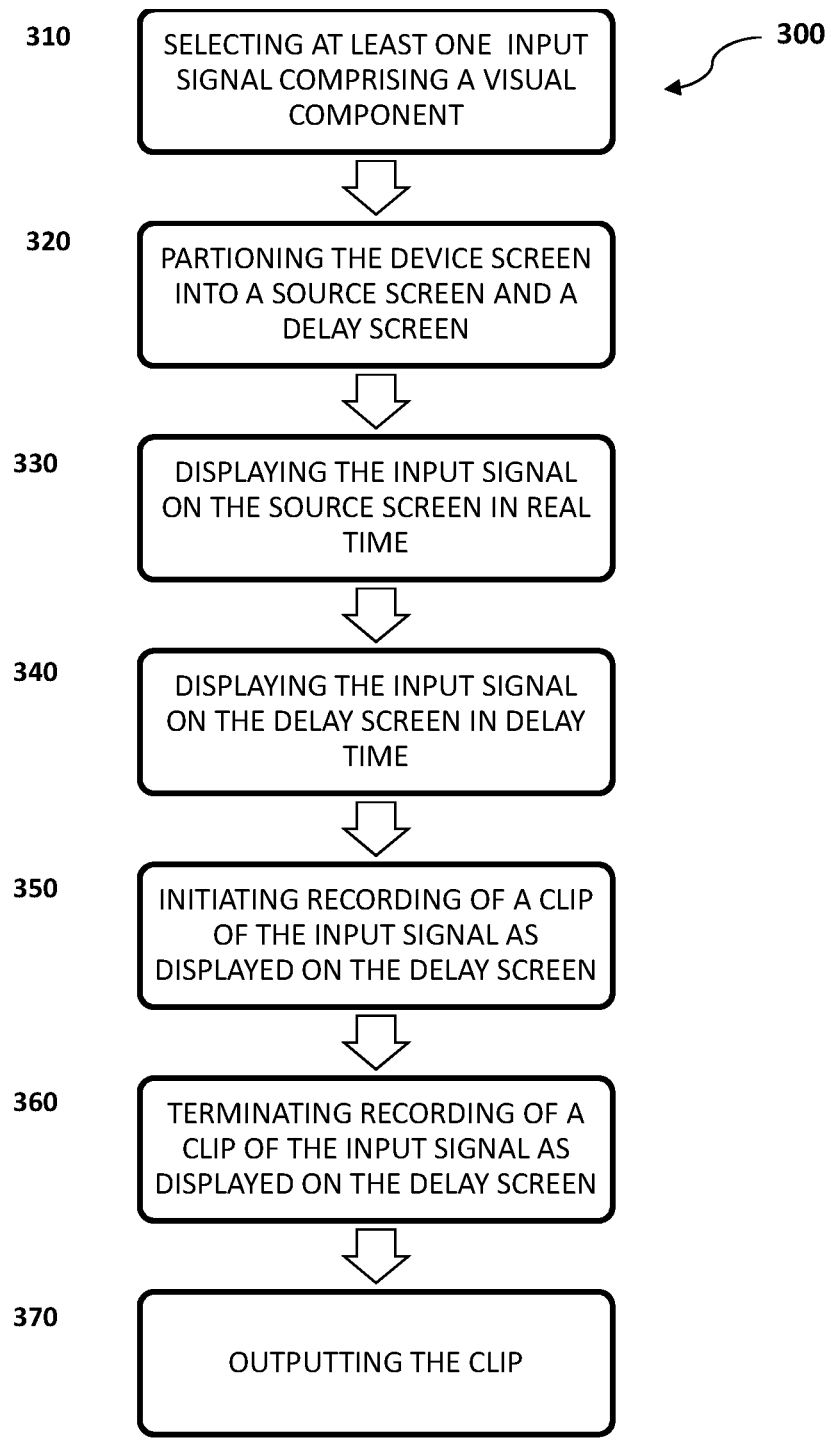
FIG. 7 is a diagrammatic representation of one illustrative embodiment of a method for visual editing of an input signal in accordance with the present invention.

FIG. 7 is a diagrammatic representation of one illustrative embodiment of a method for visual editing of at least one input signal on an editing device having a device screen 300. In the embodiment of FIG. 7, a user selects 310 at least one input signal comprising at least one visual component. The input signal may be stored locally on the editing device, connected to or in communication with the editing device, or streamed across a communication network such as the Internet.

A device screen is partitioned 320 into a source screen and a delay screen, in accordance with one embodiment of the present invention. The source screen and the delay screen can be displayed either concurrently or separately on the device screen. The user selects between a plurality of different display configurations including, but not limited to, source screen only, delay screen only, side by side, source screen picture-in-picture, delay screen picture-in-picture, etc., as described above with reference to FIGS. 3A through 3D.

In at least one embodiment of the present method 300, an input signal is displayed 330 on the source screen in real time. In the case where the input signal comprises an audio component, a visual representation of the audio signal is displayed on the source screen. In at least one further embodiment, an input signal is then displayed 340 on the delay screen in delay time. The delay time is preset, however, in at least one embodiment, a user can reset a delay time tailored to a particular user's reaction time. The user can adjust the delay time on the editing device during the display playback of the input signal. In at least one embodiment, a user adjusts the delay time during recording of a clip. In one further embodiment, when a user adjusts the delay time during playback of the input signal on the editing device, the display of the input signal on the delay screen adjusts correspondingly to the new delay time.

A user initiates recording 350 of a clip of an input signal based on the replay of a visual image displayed on a delay screen in accordance with one embodiment of the present method 300. In at least one further embodiment, the user pauses and resumes recording at any time to selectively record only those desired portions of the input signal, which the user has previously viewed either live or as displayed on a source screen, thus allowing visual editing of the input signal. In at least one embodiment, the pausing and resuming operations will not create a plurality of clips, but rather results in a single, composite clip.

In accordance with one further embodiment of the present method 300, a user terminates 360 recording of a clip of the input signal as displayed on the delay screen. Subsequently, the clip is output 370. In another embodiment, termination 360 results in a clip being output 370 automatically. In another embodiment, termination 360 results in prompting the user on how or where to output 370 the clip. In at least one embodiment, output 370 of a clip further includes encoding the clip with at least one codec. The user further selects the codecs and/or file format in which the clip is output 370. Output 370 may further comprise, by way of example only, saving a clip in the internal memory 102 of the editing device, to an attached storage medium, to a storage medium in communication with the editing device, or to a server such as a cloud storage provider or social media provider over the Internet.

Since many modifications, variations and changes in detail can be made to the described preferred embodiment of the invention, it is intended that all matters in the foregoing description and shown in the accompanying drawings be interpreted as illustrative and not in a limiting sense. Thus, the scope of the invention should be determined by the appended claims and their legal equivalents.

Now that the invention has been described,
What is claimed is:

1. A video capture and editing system for optimizing the recording of live video clips of a live event prior to storage in a non-transitory computer accessible storage medium of a mobile electronic device by a single user comprising:
the mobile electronic device comprising a video camera, a single device screen, a buffer memory and said non-transitory computer accessible storage medium, said video camera and said single device screen fixedly mounted relative to each other in the mobile electronic device,
at least a portion of the single device screen comprising a first window and a second window,
a media module resident on the mobile electronic device, said media module receiving a live video stream from said video camera and displaying said live video stream in the first window of said single device screen to facilitate the single user's continuous orienting of the video camera towards the live event,
said media module storing said live video stream in said buffer memory,
said media module obtaining a delayed live video stream from the buffer memory after a delay period and displaying said delayed live video stream in the second window of said single device screen, the second window displayed concurrently on the single device screen with at least a portion of the first window, wherein the delayed live video stream in the second window lags the live video stream in the first window by the delay period,
said single device screen including a first graphical user interface displayed on the single device screen in proximity to the second window which provides the single user with an affordance to selectively initiate recording of a video clip of said delayed live video stream in said non-transitory computer accessible storage medium which is started at the same time corresponding to the delayed live video stream being displayed on said second window, and
said single device screen further including a second graphical user interface displayed on the single device screen in proximity to the second window which provides the single user with an affordance to change said delay period during operation of said portable electronic device.

2. The editing system of claim 1 wherein said single device screen comprises a touchscreen on a first exterior surface of the mobile electronic device and the video camera faces outward from an opposing exterior surface of the mobile electronic device.

3. The editing system of claim 2 wherein said touchscreen includes a third graphical user interface which provides the user with an affordance to insert a visual tag into the live video stream during display of said live video stream in said first window.

4. The editing system of claim 2 wherein said second graphical user interface comprises a slide bar.

5. The editing system of claim 2 wherein said second graphical user interface comprises a plurality of predefined delay increments.

6. The editing system of claim 1 wherein said media module further includes a plurality of different user selectable display configurations for said first and second windows of said first device screen.

7. The editing system of claim 6 wherein said media module further provides an affordance that allows the user to switch between said plurality of different user selectable display configurations via a swiping motion on the touchscreen.

8. The editing system of claim 6 wherein said plurality of different user selectable display configurations includes at least one member of the group consisting of a first and second window side by side configuration, a first window picture-in-picture configuration at least partially overlapping the second window, and a second window picture-in-picture configuration overlapping at least a portion of the first window.

9. The editing system of claim 1 wherein said live video stream comprises a visual conversion of a non-visual source.

10. The editing system of claim 1 wherein said mobile electronic device includes a member of the group consisting of a camera, a digital video camera, a portable computer, a tablet computer, a cell phone, a wearable computer watch, a wearable computing visor, a set of wearable glasses or a smart phone.

11. A method for allowing a single user to capture and editing a live video stream to optimize the storage of a video clip in a non-transitory computer accessible storage medium of a mobile electronic device having an integrated single device screen and an integrated video camera comprising:
the single user pointing the video camera of the mobile electronic device towards a live event to acquire the live video stream with the video camera,
partitioning at least a portion of the single device screen into a first display window and a second display window,
displaying the live video stream in the first display window,
storing the live video stream in a buffer memory of the mobile electronic device,
obtaining a delayed live video stream from the buffer memory after a predetermined delay period, the delayed live video stream lagging the live video stream by the predetermined delay period,
displaying the delayed live video stream in the second display window, the first and second display windows concurrently appearing on the single device screen,
providing the single user with a user-selectable affordance on the single device screen in proximity to the second display window to initiate recording of a video clip of the delayed live video stream beginning at the same time that the delayed live video stream is being displayed in the second display window,
providing the single user with a user-selectable affordance on the single device screen in proximity to the second display window to terminate recording of the video clip of the delayed live video stream ending at the same time that the delayed live video stream is being displayed in the second display window, and
storing the video clip in the non-transitory computer accessible storage medium of the mobile electronic device.

12. The method of claim 11, further comprising the step of transmitting the at least one clip to a cloud storage service.

13. The method of claim 11, further comprising the step of transmitting the at least one clip to a social media platform.

14. The method of claim 11, further comprising the step of transmitting the at least one clip to a storage medium external to the portable electronic device.

15. A system for live clipping of a live video stream by a single user during video capture and editing prior to transmission, comprising:
a mobile electronic device having a camera for collecting the live video stream, a buffer memory, a non-transitory computer accessible storage medium and a single device screen fixedly mounted relative to the camera,
a media module resident in the mobile electronic device, the media module receiving the live video stream from the camera, displaying the live video stream in a first window of the single device screen to allow the single user to orient the camera towards a live event and storing said live video stream in said buffer memory in a sequential fashion where an oldest memory location in said buffer memory is overwritten with a newer data from said live video stream,
said media module further obtaining said stored live video stream from said buffer memory after a predetermined delay period and displaying said stored live video stream in a second window of the single device screen, the first and second windows displayed concurrently on the single device screen, wherein the stored live video stream displayed in the second window lags the live video stream displayed in the first window by the predetermined delay period, and
said single device screen including at least one user-selectable indicia in proximity to the second window that provides the single user with an affordance to view the lagging video stream in the second window and begin recording at least one clip of the lagging video stream starting from a point corresponding to the lagging video stream as it is displayed in said second window into said non-transitory computer accessible storage medium,
wherein said at least one user-selectable indicia comprises a record button that initiates recording of the at least one clip.

16. The system as recited in claim 15 wherein said at least one user-selectable indicia further comprises a pause button that provides the user with an affordance to selectively pause recording of the at least one clip.

17. The system as recited in claim 16 wherein said pause button further provides the user with an affordance to selectively resume recording of said at least one clip.

18. The system as recited in claim 15 wherein said single device screen is a touchscreen and said at least one user-selectable indicia is operable via the touchscreen.

19. The system as recited in claim 15 wherein said at least one user-selectable indicia further comprises a stop button which terminates recording of the at least one clip and automatically stores the at least one clip in said non-transitory computer accessible storage medium.

20. The system as recited in claim 19 wherein said at least one user-selectable indicia further comprises a stop button which terminates recording of the at least one clip and provides the single user with an affordance to select a file format with which to store the at least one clip in said non-transitory computer accessible storage medium.

* * * * *